United States Patent [19]
Clifford

[11] 3,712,648
[45] Jan. 23, 1973

[54] SELF-ANCHORABLE PIPE JOINT
[75] Inventor: Norman John Clifford, Beeston, England
[73] Assignee: British Steel Corporation, London, England
[22] Filed: Aug. 17, 1970
[21] Appl. No.: 64,236

[30] Foreign Application Priority Data
Sept. 10, 1969 Great Britain......................44,689/69

[52] U.S. Cl. ....................................285/321, 285/374
[51] Int. Cl. .........................F16l 21/06, F16l 21/08
[58] Field of Search.......285/321, 369, 374, 356, 348

[56] References Cited
UNITED STATES PATENTS

| 2,877,732 | 3/1959 | Eaton | 285/321 X |
| 2,913,264 | 11/1959 | Suendermann | 285/348 X |
| 2,722,438 | 11/1955 | Kennison | 285/374 X |

FOREIGN PATENTS OR APPLICATIONS

| 730,595 | 3/1966 | Canada | 285/321 |
| 671,103 | 9/1963 | Canada | 285/321 |
| 932,001 | 7/1963 | Great Britain | 285/321 |

Primary Examiner—David J. Williamowsky
Assistant Examiner—Wayne L. Shedd
Attorney—Ostrolenk, Faber, Gerb & Soffen

[57] ABSTRACT

In self-anchorable pipe joints, of the kind in which a spigot at the end of one pipe is inserted into a socket at the end of the other pipe, a sealing member of tapered cross-section is placed under axial compression in the annular gap between the spigot and socket, the outer, transverse face of the sealing member is initially inclined relative to the axis of the sealing member. There is also provided an annular self-anchorable member for use in a self-anchorable pipe joint, having an anchoring face at about 60° to its axis. A pipe joint as disclosed is more resistant to leakage on angular misalignment than previous joints.

3 Claims, 2 Drawing Figures

PATENTED JAN 23 1973
3,712,648
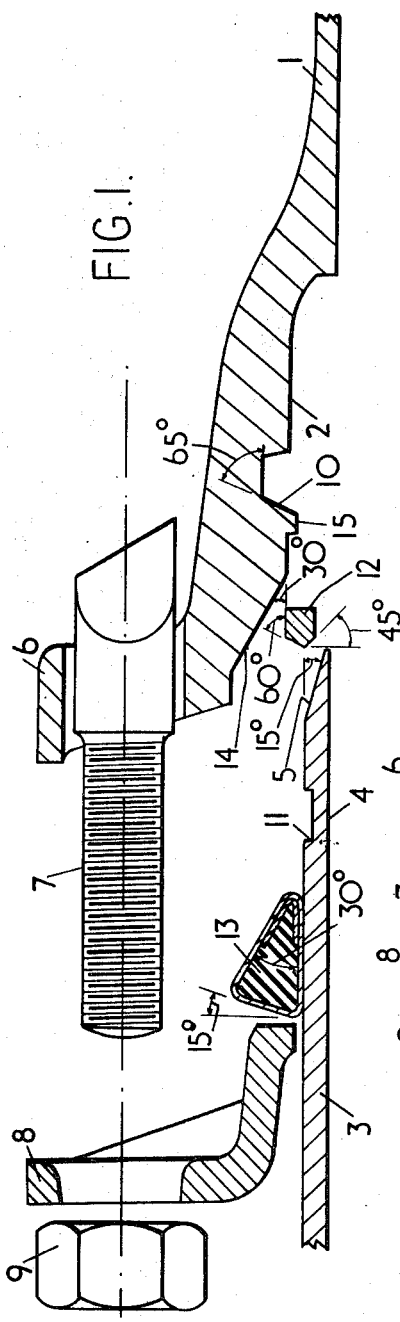
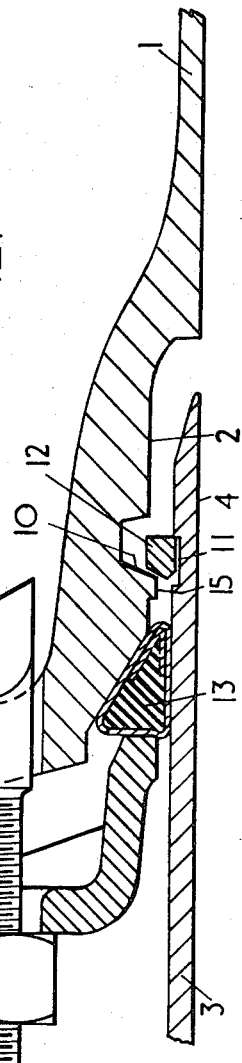
INVENTOR
NORMAN JOHN CLIFFORD
BY
Ostrolenk, Faber, Gerb & Soffen
ATTORNEYS

SELF-ANCHORABLE PIPE JOINT

This invention relates to self-anchorable pipe joints, of the kind in which a spigot at the end of one pipe is inserted into a socket at the end of the other pipe and a sealing member of tapered cross-section is placed under substantially axial compression in the annular gap between the spigot and socket. It is to be understood that the spigot and/or socket may be formed on or in an intermediate coupling member rather than directly on the pipes to be joined.

Previous self-anchoring pipe joints have been described for example in British Pat. specification Nos. 1,032,585, 1,043,063, 1,136,512, 1,146,453 and 1,167,076. These joints, however, have two principal disadvantages.

1. They must always be used as self-anchored joints having been designed and made solely for this purpose.
2. They are expensive to produce and often cumbersome to assemble.

These disadvantages were to some extent overcome by the developments of self-anchorable pipe joints as described in British Pat. specification Nos. 932,001, 932,002 and 898,884.

All these pipe joints have been found to be satisfactory so long as the pipes remain in axial alignment, but leakage of the contents of the pipeline occurred if adjacent pipes suffered relative deflection. At low pressures failure occurred by displacement of the rubber gasket with subsequent leakage around the joint. At high pressures failure occurred by lifting of the circlip and tearing of the spigot end of the pipe. Clearly this failure placed severe limits on:

a. The pressure carrying capacity of the pipeline at any given level of deflection of adjacent pipe members.

b. The deflection which the pipeline will accommodate without leakage at any given level of internal pressure.

The present invention overcomes these disadvantages and therefore allows for much higher combinations of internal pressure and pipe deflection than did the previously listed joints.

In addition it may be used as a self-anchored or unanchored joint as required. Thus using the same joint profile a pipeline may be jointed unanchored in the most part and only anchored where necessary, i.e., to cross a river or other such obstacle. In this case an anchoring groove may be machined into the spigot on site.

According to one aspect of the present invention, the outer, transverse face of the sealing member, against which the substantially axial compressing force is exerted, is initially inclined relative to the axis of the sealing member, instead of being at right angles to the axis as in previous arrangements. Also according to the invention I provide a sealing ring for use in a self-anchorable pipe joint, having a cross-section comprising a first surface substantially parallel to the axis of the ring and two further surfaces inclined at acute angles to the first surface. The angle of inclination is preferably such that the angle included between the said face and the said axis is between 70° and 80°, but preferably 75°.

According to another aspect of the present invention, the included angle at the nose of the sealing member i.e., the angle of taper of the cross section of the sealing member, is made larger than hitherto, being preferably about 30°.

Preferably, as in previous self-anchorable joints, an annular anchoring member is disposed between abutments on the spigot and in the socket, to prevent axial separation of the pipes. This anchoring member is independent of the sealing member.

According to a further aspect of the invention, we provide an annular self-anchorable member for use in a self-anchorable pipe joint, having a cross-section including a first surface inclined at an angle of substantially 60° to the axis of the member. Preferably the abutment surface of the socket is between 60° and 70°. In a particular preferred arrangement this angle is substantially 65°, i.e., 5° to the anchoring member surface, relative to the axis of the socket.

Preferably, as in previous arrangements, the sealing member is axially compressed by a metal gland ring secured to the socket pipe end.

One convenient embodiment of the invention is shown, by way of example only, in the accompanying drawings, in which:

FIG. 1 shows the components of a self-anchorable joint before assembly, and

FIG. 2 shows the joint after assembly.

The drawings show a pipe end 1 formed with an enlarged portion containing a socket 2, and a pipe end 3 forming a spigot 4 with a chamfered tip 5. The pipe end 1 had a flange 6 receiving a plurality of bolts 7 (only one being shown). A gland ring 8 which encircles the pipe end 3 is secured to the bolts 7 by nuts 9.

The socket has an internal groove 10 and the spigot has a corresponding external groove 11. An anchoring ring 12, in the nature of a split ring or circlip is sprung into the groove 10 and the spigot is pushed into the socket until the groove 11 registers with the groove 10 and the ring 12 springs into the groove 11, thereby axially securing and locating the pipe ends. The grooves have flat base surfaces and the groove 10 has a tapered surface, the ring 12 having a wedge shaped side whose two tapered surfaces co-operate with the tapered surface of the groove 10 and the chamfered tip of the spigot to force the ring into the groove 11 when the pipes are subjected to a force tending to separate them, and to facilitate insertion of the spigot, respectively.

The angle of the tapered surface of the groove 10 lies within the range 60° to 70° to the socket pipe axis, but preferably at 65°. In the undeflected position, the angle between the tapered surface of the groove 10 and the co-operating tapered surface of the ring 12 is substantially 5° to allow a 3° deflection of the joint from the socket face.

It has been established that with the tapered surface of groove 10 at an angle of 65°, a satisfactory downward component of thrust will be directed onto the ring 12 thus ensuring firm engagement of ring 12 in spigot groove 11. Investigations have shown that grooves 10 produced with the tapered surface at angles to the socket pipe axis more acute than 65° will progressively induce a wedging action of ring 12 into the annulus formed between spigot 4 and socket surface 15 resulting in leakage of the joint due to the displacement of the spigot 4. Angles greater than 65° will progressively produce an increased turning moment to ring 12 resulting in twisting of the ring 12 and possible displacement from the spigot groove 11.

Further investigations have shown that without the 5° difference in the angles between the co-operating tapered surfaces of the groove 10 and the ring 12 any small deflection of the spigot 4 in the socket 1 will cause contact of the extreme outer edge of the tapered surface of the ring 12 with groove 10. Contact at this point will induce a high turning moment into the ring 12 impairing its stability in the spigot groove 11 and will also restrict movement of the tapered surface of ring 12 along the co-operating surface of groove 10. It has been found that the 5° angle increases the resistance of ring 12 to rotation in spigot groove 11 since this causes the thrust to be applied at the nearest point on the tapered surface of ring 12 to the groove 11 making the turning moment on ring 12 a minimum and ensures that this condition is maintained throughout the full working deflection of the joint. In addition this difference in angle facilitates movement of ring 12 along the tapered surface of the groove 10 as the joint is deflected and allows the spigot 4 to remain centralized within the gasket ring 13.

Sealing of the joint is effected by a gasket ring 13 made of resilient material e.g., rubber and preferably provided with soft metal reinforcement. The ring 13 has a triangular cross-section with one face parallel to the axis of the ring and of the pipes, and a second face at an angle of between 25° and 35°, but preferably 30° to the first face. These two faces engage respectively the outer surface of the spigot and the inner surface of a correspondingly tapered portion 14 of the socket. In the assembled joint, the nuts 9 are screwed up so that the gland 8 presses against the third outer face of the ring 13, thereby axially compressing the ring. Owing to the resilience of the material of the ring, it is compressed against the adjacent surfaces of the spigot and socket. Hitherto, the outer face of the ring has been made initially at right angles to the axis of the ring. In contrast, in the present joint, this face is initially between 70° and 80°, preferably 75°, to the axis, that is, between 10° and 20°, preferably 15°, to a plane at right angles to the axis.

Tests show that as the angle is reduced to below 15° the effective space into which the rubber can flow when compressed is also reduced. This impairs the sealing efficiency of the joint since the rubber is less able to conform to the spigot surface when the joint deflects. As the angle increases above 15° there is an increasing risk of rubber becoming trapped between the spigot and the gland nose with a resultant loss of gasket compression.

The joint described has been found to provide reliable sealing even when the pipes are deflected relative to one another.

Our investigations have shown that in the previous joints with the outer face of the sealing ring at right angles to the axis, deflection of the pipes caused the joint to pivot around the anchoring ring, thereby effectively reducing the compression of the sealing ring and permitting leakage. It was found that the previous design of sealing ring was initially heavily compressed against the internal surface of the socket, but not sufficiently strongly compressed against the external surface of the spigot. We have found that by making the outer surface of the ring oblique the effective compression against the outer surface of the spigot can be substantially increased, thereby preventing leakage when the pipes are deflected. A large angle of taper of the sealing ring, e.g., 30° as shown, also improves the sealing, and the gasket is larger than those used hitherto. Investigations have shown that as the tapered surface of the sealing ring diverges from 30°, there is progressive reduction in sealing efficiency when the joint is deflected. In the case of angles below 30°, gasket compression reduces rapidly with deflection due to the progressive loss in volume of rubber available to accommodate spigot movement. As the angle exceeds 30°, the wedging action of the gasket becomes progressively impaired and sealing efficiency on the protective nose of the gasket is thus reduced. It is to be understood that, in the assembled joint, the outer face of the sealing ring will be deformed and will not remain at an angle of 75° to the axis. Such deformation is shown in FIG. 2.

It will be seen that the throat of the socket is stepped so as to provide a large tapered chamber to receive the sealing ring with its nose projecting into the gap between the spigot and the socket, and a narrow throat at 15 adjacent to the anchoring ring.

I claim:

1. In a spigot and socket joint comprising,
    a spigot having a longitudinal axis of extension, and including a circumferential exterior surface extending generally along said axis; said spigot including an inlet which is inserted into a socket;
    a socket having an axis of extension substantially parallel to said spigot axis; said socket having an inlet; said socket including an opening extending back from said inlet, which said opening is defined by the surrounding socket wall; said socket wall being spaced away from said spigot surface and surrounding said spigot inlet and surface to define an annular gap therebetween; said surrounding socket wall including a tapered portion which tapers inwardly toward said spigot inlet, thereby tapering said annular gap;
    a resilient sealing member interposed in said annular gap and including a surface which engages said socket wall tapered portion and engages that portion of said spigot exterior surface opposed to said socket wall tapered portion; said resilient member having a tapered shape to conform to the aforesaid tapered shape of said annular gap; said resilient member having a transverse surface facing away from said spigot inlet;
    a compressive member carried by and attached to said joint and having a pressure face positioned such that it is moved into engagement with said resilient member transverse surface to axially compress said resilient member;
    the improvement comprising,
    when said pressure face of said compressive member is moved into engagement with said resilient member transverse surface, said pressure face is oriented and positioned so as to be at a predetermined incline with respect to said resilient member transverse surface and so as to bear initially upon that radially inmost portion of said transverse surface that is closest to said spigot exterior surface,
    anchoring means communicating with both of said spigot and said socket to secure them together and prevent axial separation thereof,
    each of said spigot and said socket having an abutment extending into said annular gap; said anchoring means comprising an annular self-anchoring member which engages said abutments and thereby prevents axial separation, said socket abutments comprise a surface inclined at an angle of 60° – 70° to said socket axis and inclined, measuring into said annular gap, toward said socket inlet, said anchoring member including an abutting surface that abuts against said socket abutment surface; said anchoring member being shaped such that its said abutting surface is inclined at an angle with respect to said socket axis that is less than the angle of incline of said socket abutment surface, such that the angle formed between these said surfaces is approximately 5°.

2. In a spigot and socket joint comprising, a spigot, including a circumferential exterior surface that is inserted into a socket;

a socket having an axis of extension, said socket including an inlet and including an opening extending back from said inlet, that is defined by a surrounding socket wall; said spigot being inserted into said socket opening;

said socket surrounding wall including an annular groove; said spigot circumferential surface including a annular groove, said annular grooves being so positioned relative to each other as to receive an annular anchoring member which is sprung into both said grooves, thereby to prevent axial separation of said socket and said spigot;

the improvement comprising, said socket groove being defined on the side thereof facing toward said socket inlet by a side wall which is inclined at an angle to said socket axis of 60° and 70°;

said anchoring member including an abutting surface which abuts said socket groove inclined side wall and which anchoring member abutting surface is inclined at an angle to the socket axis of approximately 5° less than the angle of incline of said socket groove side wall.

3. In a spigot and socket joint comprising, a spigot, including a circumferential exterior surface that is inserted into a socket;

a socket having an axis of extension, said socket including an inlet and including an opening extending back from said inlet, that is defined by a surrounding socket wall; said spigot being inserted into said socket opening;

said socket surrounding wall including an annular groove; said spigot circumferential surface including an annular groove, said annular grooves being so positioned relative to each other as to receive an annular anchoring member which is sprung into both said grooves, thereby to prevent axial separation of said socket and said spigot;

the improvement comprising, said socket groove being defined on the side thereof facing toward said socket inlet by a side wall which is inclined at an angle to said socket axis of 60° to 70°;

said anchoring member including an abutting surface which abuts said socket groove inclined side wall said abutting surface of said anchoring member being inclined to the socket axis and forming a sharply acute angle with the socket groove side wall.

* * * * *